United States Patent
Kim et al.

(10) Patent No.: US 9,423,872 B2
(45) Date of Patent: Aug. 23, 2016

(54) PORTABLE DEVICE FOR TRACKING USER GAZE TO PROVIDE AUGMENTED REALITY DISPLAY

(71) Applicant: LG ELECTRONICS INC., Seoul (KR)

(72) Inventors: Yongsin Kim, Seoul (KR); Jongho Kim, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/190,769

(22) Filed: Feb. 26, 2014

(65) Prior Publication Data

US 2015/0199848 A1   Jul. 16, 2015

(30) Foreign Application Priority Data

Jan. 16, 2014   (KR) .......................... 10-2014-0005455

(51) Int. Cl.
*G06T 7/00* (2006.01)
*G06F 3/01* (2006.01)
*G06T 11/00* (2006.01)

(52) U.S. Cl.
CPC ............... *G06F 3/013* (2013.01); *G06T 11/00* (2013.01)

(58) Field of Classification Search
CPC ....... G06T 19/006; G06T 7/00; G02B 27/017
USPC ......................................................... 345/633
See application file for complete search history.

(56) References Cited

U.S. PATENT DOCUMENTS

| | | | |
|---|---|---|---|
| 8,264,505 B2 | 9/2012 | Bathiche et al. | |
| 8,316,450 B2 | 11/2012 | Robinson et al. | |
| 8,510,166 B2 * | 8/2013 | Neven | 705/14.68 |
| 2005/0107952 A1 | 5/2005 | Hoshino et al. | |
| 2010/0238161 A1 * | 9/2010 | Varga et al. | 345/419 |
| 2011/0158478 A1 | 6/2011 | Yamada et al. | |
| 2011/0164163 A1 | 7/2011 | Bilbrey et al. | |
| 2012/0019557 A1 | 1/2012 | Aronsson et al. | |
| 2012/0162254 A1 * | 6/2012 | Anderson | H04N 5/2621 345/633 |
| 2012/0293548 A1 * | 11/2012 | Perez et al. | 345/633 |
| 2014/0098134 A1 * | 4/2014 | Fein et al. | 345/633 |

FOREIGN PATENT DOCUMENTS

| | | |
|---|---|---|
| JP | 5104679 B2 | 12/2012 |
| KR | 10-2011-0136012 A | 12/2011 |
| KR | 10-2013-0112578 A | 10/2013 |
| KR | 10-1320683 B1 | 10/2013 |

* cited by examiner

*Primary Examiner* — Jacinta M Crawford
*Assistant Examiner* — Shivang Patel
(74) *Attorney, Agent, or Firm* — Birch, Stewart, Kolasch & Birch, LLP (57) ABSTRACT

A method for controlling a portable device is disclosed. The method includes displaying a plurality of augmented reality (AR) images, detecting a gaze of a user, determining a target object based on the gaze of the user, identifying an associated AR image that is associated with the target object and a non-associated AR image that is not associated with the target object from the plural AR images, and maintaining display of the associated AR image and terminating display of the non-associated AR image when the target object is a moving object.

17 Claims, 10 Drawing Sheets

PORTABLE DEVICE FOR TRACKING USER GAZE TO PROVIDE AUGMENTED REALITY DISPLAY

Pursuant to 35 U.S.C. §119(a), this application claims the benefit of Korean Patent Application No. 10-2014-0005455 filed on Jan. 16, 2014, which is hereby incorporated by reference as if fully set forth herein.

BACKGROUND OF THE INVENTION

1. Field of the Invention

The present specification relates to a portable device, and more particularly, to a portable device for displaying an augmented reality (AR) image and a method for controlling the same.

2. Discussion of the Related Art

Augmented reality (AR) technologies obtained by mixing a real object and a virtual object allow a user to see a real image together with an AR image to provide additional information together with sense of reality. For example, when surroundings are seen by a camera of a smart phone, an AR image such as a location and telephone number of a neighboring store, etc. together with a real image is displayed as a stereoscopic image. AR technologies can also be applied to a portable device.

A conventional portable device for providing an AR service displays a plurality of AR images on a limited display screen, and thus a user has difficulty in easily acquiring desired information from the AR images.

SUMMARY OF THE INVENTION

Accordingly, the present specification is directed to a portable device and a method for controlling the same that substantially obviates one or more problems due to limitations and disadvantages of the related art.

An object of the present specification is to provide a portable device and a method for controlling the same, which change a method for displaying an augmented reality (AR) image in consideration of user gaze to provide a user friendly AR service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable device includes a gaze detection unit configured to detect a gaze of a user, a display unit configured to display an image, and a processor configured to control the gaze detection unit and the display unit, wherein the processor is further configured to display a plurality of AR images, determine a target object based on the gaze of the user, identify an associated AR image that is associated with the target object and a non-associated AR image that is not associated with the target object from the plurality of AR images, and maintain display of the associated AR image and terminate display of the non-associated AR image when the target object is a moving object.

In another aspect of the present specification, a method for controlling a portable device includes displaying a plurality of AR images, detecting a gaze of a user, determining a target object based on the gaze of the user, identifying an associated AR image that is associated with the target object and a non-associated AR image that is not associated with the target object from the plurality of AR images, and maintaining display of the associated AR image and terminating display of the non-associated AR image when the target object is a moving object.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments, examples of which are illustrated in the accompanying drawings. However, the embodiments should not be construed as limited to the exemplary embodiments set forth herein.

The terms used in the present specification are defined in consideration of functions used in the present specification, and can be changed according to the intent, conventionally used methods of operators, or advent of new technologies. In specific cases, the terms can be selected by an application. In this case, the meaning of the terms will be described in a corresponding embodiment. Accordingly, definitions of the terms should be understood on the basis of the substantial meaning and the entire description of the present specification instead of simple names of the terms.

In the present specification, a portable device may refer to various types of portable devices for displaying an augmented reality (AR) image. For example, the portable device may be a head mounted display, a smart phone, a smart pad, a table computer, a notebook computer, a music player, or a foldable display device. In addition, in the present specification, the AR image may be a virtual image for providing additional information about a real environment. In this case, the AR image may include a graphic image, text, a sign, and an emoticon.

Figure 1:
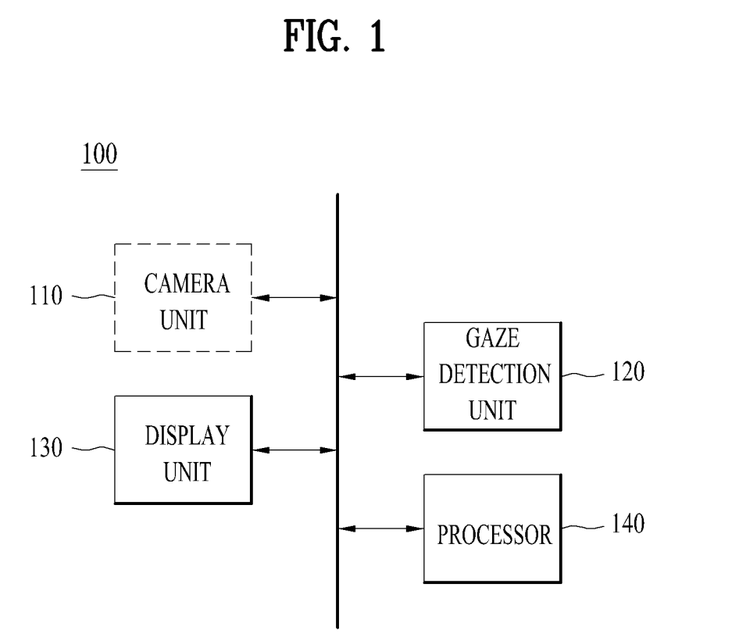
FIG. 1 is a block diagram illustrating a portable device according to an embodiment of the present specification.

FIG. 1 is a block diagram illustrating a portable device 100 according to an embodiment of the present specification.

Referring to FIG. 1, the portable device 100 may include a camera unit 110, a gaze detection unit 120, a display unit 130, and a processor 140.

The camera unit 110 may capture an image positioned in front of the portable device 100. In this case, the captured image may include at least one real object and the real object may include a marker of an AR image. Here, the real object may refer to an object present in a real environment. Here, the marker may be an appointed pattern or code included on a surface of the real object or the real object itself.

The gaze detection unit 120 may detect user gaze. In addition, the gaze detection unit 120 may detect change in the user gaze. Though this, the portable device 100 may detect a user gaze direction or an object that the user is looking at. In this case, the gaze detection unit 120 may be disposed on one surface of the portable device 100 and may be configured as the camera unit 110 for capturing a gaze image. For example, when the portable device 100 is a head mounted display, the gaze detection unit 120 may be disposed on a rear surface of the head mounted display and may be configured as a rear camera unit for capturing a gaze image. As another example, when the portable device 100 is a smart phone, the gaze detection unit 120 may be disposed on a front surface of the smart phone and may be configured as a front camera unit for capturing a gaze image.

The display unit 130 may display an image. The display unit 130 may display an image captured by the camera unit 110. However, when the portable device 100 is a head mounted display, the display unit 130 may not display the image captured by the camera unit 110.

In addition, the display unit 130 may display at least one AR image. For example, the display unit 130 may display an AR image corresponding to a marker detected from the image captured by the camera unit 110. As another example, the display unit 130 may display an AR image obtained based on position information and direction information of the portable device 100. In this case, the portable device 100 may acquire the location information and the direction information based on a global positioning system (GPS). Through this, the portable device 100 may display an AR image corresponding to a surrounding real environment of the portable device 100 without detection of a marker via the camera unit 110. In addition, when the portable device 100 is a head mounted display, the display unit 130 may include a see-through display panel and display an AR image on an object of a real world that a user views via the see-through display panel.

The processor 140 may control at least one unit included in the portable device 100. In detail, the processor 140 may control each of the aforementioned units and control data transmission and/or reception between the units.

In addition, the processor 140 may display at least one AR image. For example, the processor 140 may detect the marker from the image captured by the camera unit 110 or the image displayed by the display unit 130, obtain an AR image corresponding to the detected marker, and display the obtained AR image. Upon detecting a plurality of markers, the processor 140 may obtain a plurality of AR images corresponding to the respective markers and display the obtained AR images. In addition, the processor 140 may obtain at least one AR image based on the location information and direction information of the portable device 100 and display the obtained AR image. Furthermore, a portable device according to the present specification is not limited to the aforementioned embodiments. Thus, an AR image may be obtained using various methods and the obtained AR image may be displayed.

The processor 140 may determine a target object based on user gaze. Here, the target object may be a real object and may refer to a real object determined based on a user gaze location. The processor 140 may determine the target object based on the detection result transmitted from the gaze detection unit 120. In this case, the processor 140 may determine a real object to which the user gaze is detected for a first time period or more as the target object. Here, the first time period may be input to the portable device by the user or may be set by a manufacturer during manufacture of the portable device. For example, the processor 140 may determine a real object to which the user gaze is detected for one second or more as the target object.

The processor 140 may identify at least one of an associated AR image and a non-associated AR image. The processor 140 may identify at least one of an associated AR image and a non-associated AR image from the displayed at least one AR image. Here, the associated AR image may refer to an AR image associated with the target object and the non-associated AR image may refer to an AR image that is not associated with the target object. In addition, the processor 140 may identify a plurality of associated AR images. In addition, the processor 140 may identify a plurality of non-associated AR images. In this case, the processor 140 may determine whether the target object is associated with the AR image based on a predetermined method or a predetermined algorithm to identify the associated AR image and the non-associated AR image. The predetermined method and the predetermined algorithm may be input to the portable device by the user or an AR service provider, or may be set by a manufacturer during manufacture of the portable device.

For example, when the target object is a vehicle, the processor 140 may identify an AR image containing information (e.g., location information of a parking area) associated with the vehicle as the associated AR image and identify an AR image containing only information (e.g., personal information) that is not associated with the vehicle as the non-associated AR image. As another example, when the target object is a person, the processor 140 may identify an AR image containing information (e.g., personal information) associated with the person as the associated image and identify an AR image containing only information (e.g., building information) that is not associated with the person as the non-associated AR image. Furthermore, the portable device according to the present specification is not limited to the aforementioned embodiments. Thus, the processor 140 may identify the associated AR image and the non-associated AR image by using various methods and algorithm.

In addition, the processor 140 may determine whether the target object is a moving object or a stationary object. Here, the moving object may refer to a moveable real object and the stationary object may refer to a real object that cannot move. For example, a vehicle, a bus, or the like may be the moving object and a building or the like may be the stationary object. However, in some embodiments, the moving object may be a moveable real object that is currently moving, and the stationary object may be a real object that cannot move or a moveable real object that currently stops moving.

In this case, the processor 140 may determine whether the target object is a moving object based on information obtained by a GPS. In addition, the processor 140 may determine whether the target object is a moving object based on the image captured by the camera unit 110 or the image displayed by the display unit 130. In addition, the processor 140 may detect whether the target object is a moving object based on gaze of a user who looks at the target object detected by the gaze detection unit 120.

In addition, the processor 140 may change a method for displaying an AR image according to whether the target object is a moving object or a stationary object.

Operations of the processor 140 will be described in more detail with reference to the drawings. Hereinafter, the processor 140 may be expressed as controlling the portable device 100 or at least one unit included in the portable device 100 and the description may be given on the assumption that the processor 140 and the portable device 100 are identified by each other.

FIG. 1 is a block diagram of a portable device 100 according to an embodiment of the present specification. The separately indicated blocks are formed by logical elements of the portable device 100. Accordingly, the aforementioned elements of the portable device 100 may be mounted as a single chip or a plurality of chips according to a design of the portable device 100.

Hereinafter, a portable device will be described with regard to various embodiments of the present specification in terms of an embodiment in which the portable device is a head mounted display. However, the same description is also applicable to other types of portable devices (e.g., a smart phone).

Figure 2A:
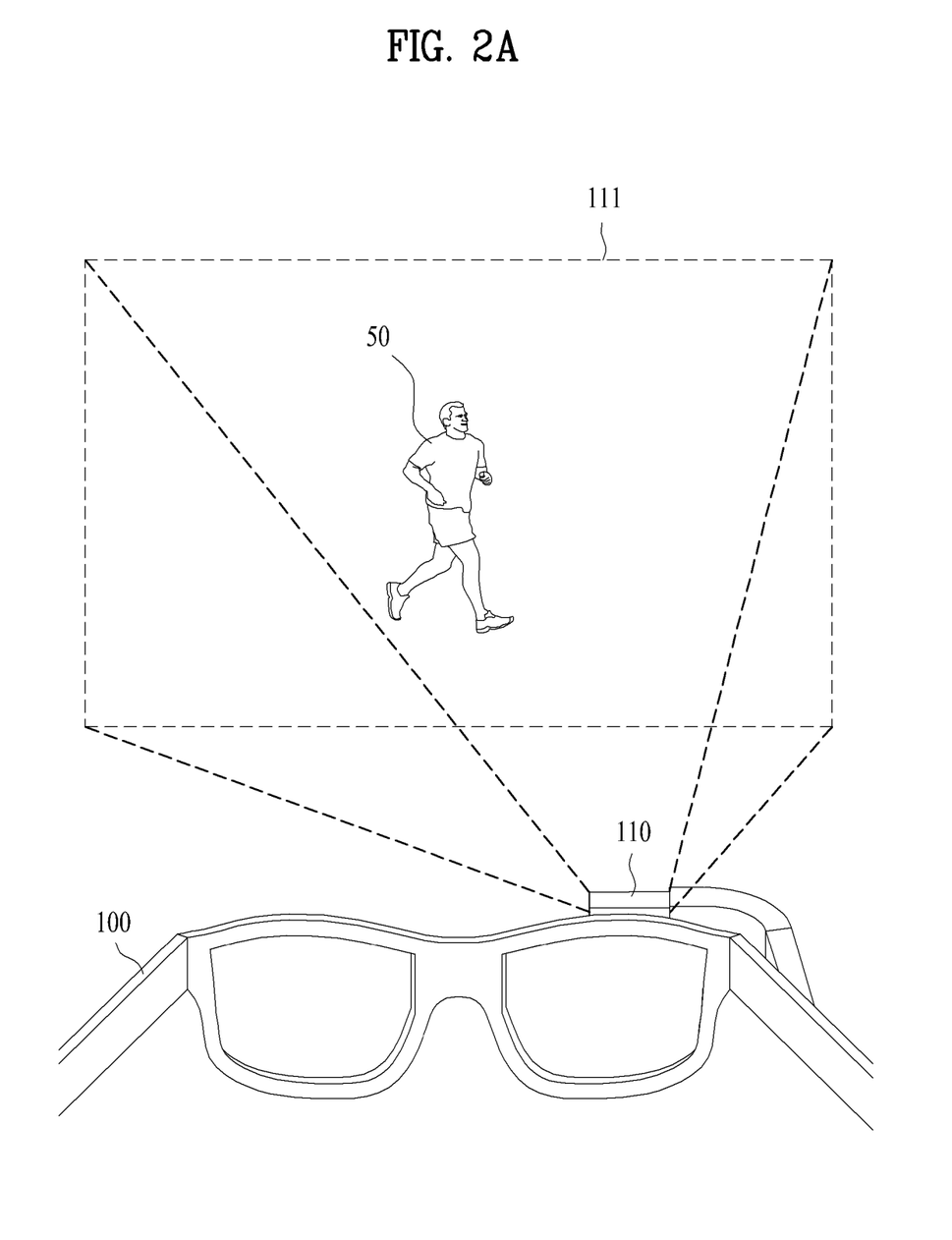
FIGS. 2A and 2B are diagrams illustrating a portable device according to an embodiment of the present specification.
Figure 2B:
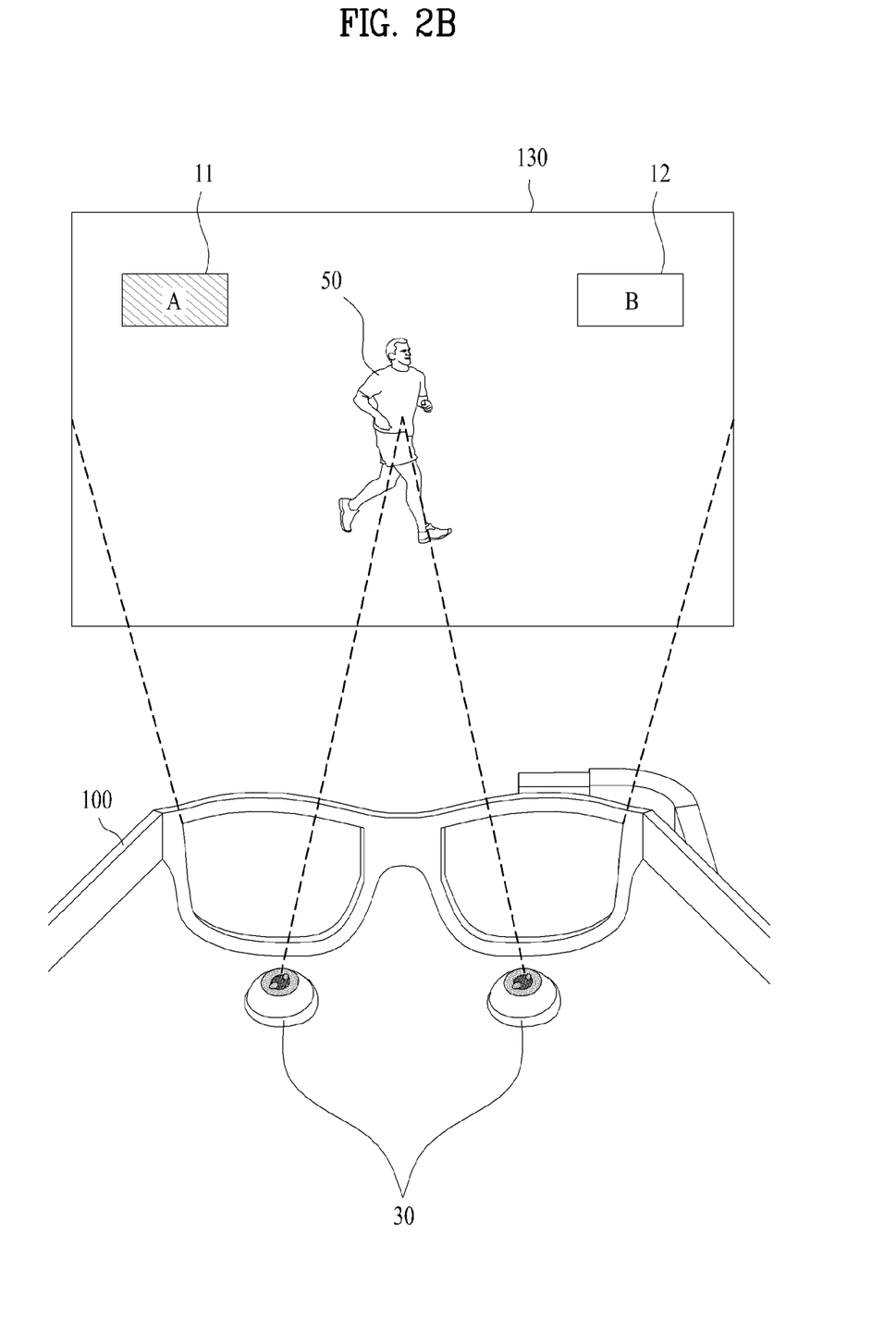

FIGS. 2A and 2B are diagrams illustrating a portable device 100 according to an embodiment of the present specification.

FIG. 2A illustrates the portable device 100 for capturing an image positioned in front of the portable device 100. FIG. 2B illustrates the portable device 100 for displaying an AR image.

Referring to FIG. 2A, the portable device 100 may capture the image positioned in front of the portable device 100 using the camera unit 110. The camera unit 110 captures an image positioned in front of the portable device 100 within a viewing angle 111. Here, the viewing angle 111 may refer to a region to be detected by an image sensor included in the camera unit 110. In this case, the captured image may contain at least one real object and the real object may contain a marker of the AR image. Thus, the portable device 100 may detect the marker within the viewing angle 111 using the camera unit 110.

Referring to FIG. 2B, the portable device 100 may display at least one AR image using the display unit 130. In this case, the portable device 100 may display at least one AR image on an object of a real world that a user views via a see-through display panel. Through this, the portable device 100 may display at least one AR image within a visual field of the user. In addition, the portable device 100 may determine a target object based on a gaze 30 of the user using the gaze detection unit 120. For example, the portable device 100 may determine a real object 50 to which the gaze 30 of the user is detected for one second or more as the target object.

Figure 3:
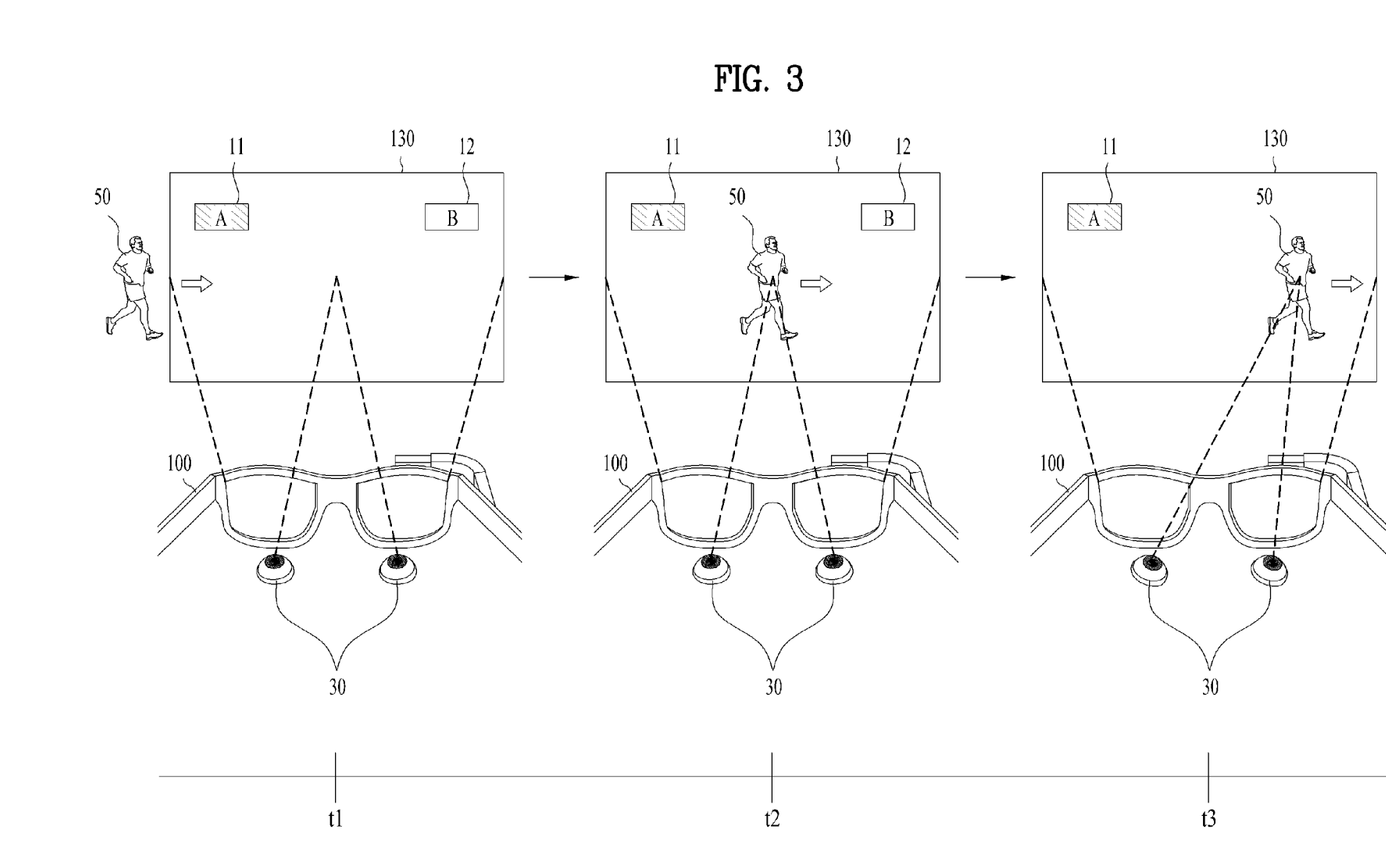
FIG. 3 is a view illustrating a method for displaying an augmented reality (AR) image by a portable device according to an embodiment of the present specification.

FIG. 3 is a view illustrating a method for displaying an AR image by a portable device according to an embodiment of the present specification. In more detail, FIG. 3 illustrates a first embodiment of a method for displaying an AR image by the portable device when a target object is a moving object. In FIGS. 3 to 6, the target object is a moving object, a first AR image 11 is identified as an associated AR image, and a second AR image 12 is identified as a non-associated AR image.

Like at a point of time t1 of FIG. 3, the portable device 100 may display the first AR image 11 and the second AR image 12 on the display unit 130. In addition, the portable device 100 may detect the gaze 30 of the user via a gaze detection unit and determine the target object based on the detected gaze 30 of the user. In this case, the portable device 100 may determine a real object to which the gaze 30 of the user is detected for a first time period or more as the target object. Here, the first time period may be input to the portable device by the user or may be set by a manufacturer during manufacture of the portable device 100.

Like at a point of time t1 of FIG. 3, when there is no object to which the gaze 30 of the user is detected for the first time period or more, the portable device 100 may not determine the target object. When the target object is not determined, the portable device 100 may maintain display of the first AR image 11 and the second AR image 12.

Like at a point of time t2 of FIG. 3, when the gaze 30 of the user is detected to the real object 50 for the first time period or more, the portable device 100 may determine the real object 50 that the gaze 30 of user is detected as the target object. In addition, when the target object is determined, the portable device 100 may be at least one of an associated AR image and a non-associated AR image from the first AR image 11 and the second AR image 12. In addition, the portable device 100 may determine whether the target object is a moving object. When the target object is a moving object, the portable device 100 may maintain display of the associated AR image and terminate display of the non-associated AR image.

Like at a point of time t3 of FIG. 3, when the target object is a moving object, the first AR image 11 is identified as an associated AR image, and the second AR image 12 is identified as a non-associated AR image, the portable device 100 may maintain display of the first AR image 11 identified as an associated AR image and terminate display of the second AR image 12 identified as a non-associated AR image. Through this, the portable device 100 may maintain only display of the associated AR image associated with the target object that the user is looking at among a plurality of AR images so as to easily obtain information about an AR image in which the user is interested.

In addition, when display of the associated AR image is maintained, the portable device 100 may adjust a display timer of the associated AR image. For example, the portable device 100 may adjust the display timer to extend display time of the associated AR image. Through this, the portable device 100 may allow the user to view the associated AR image, in which the user is interested, for a longer time.

Unlike at a time period t3 of FIG. 3, when the target object is a moving object and both the first AR image 11 and the second AR image 12 are each identified as an associated AR image, the portable device 100 may maintain display of both the first AR image 11 and the second AR image 12. In addition, when the target object is a moving object and both the first AR image 11 and the second AR image 12 are each identified as a non-associated AR image, the portable device 100 may terminate display of both the first AR image 11 and the second AR image 12.

Furthermore, when the target object is a moving object, the portable device 100 may further detect a movement and a moving direction of the target object. For example, the portable device 100 may detect the movement and the moving direction of the target object based on an image captured by a camera unit or an image displayed by the display unit 130. As another example, the portable device 100 may detect the movement and the moving direction of the target object based on change of the gaze 30 that is directed to the target object detected by a gaze detection unit.

In addition, the portable device 100 may determine whether the AR image identified as a non-associated AR image is positioned in the moving direction of the target object. When the non-associated AR image is positioned in the moving direction of the target object, the portable device 100 may terminate display of the non-associated AR image. For example, when the target object is moved to a right direction from a left direction and the non-associated AR image is positioned on a predicted moving path of the target object, the portable device 100 may terminate display of the non-associated AR image. When the non-associated AR image is not positioned in the moving direction of the target object, the portable device 100 may not terminate display of the non-associated AR image. For example, when the target object is moved to a right direction from a left direction and the non-associated AR image is positioned in an opposite direction to a predicted moving path of the target object, the portable device 100 may maintain display of the non-associated AR image. Through this, the portable device 100 may determine whether display of the non-associated AR image is terminated by further considering the moving direction of the target object, thereby preventing unnecessary termination of display of the non-associated AR image.

Figure 4:
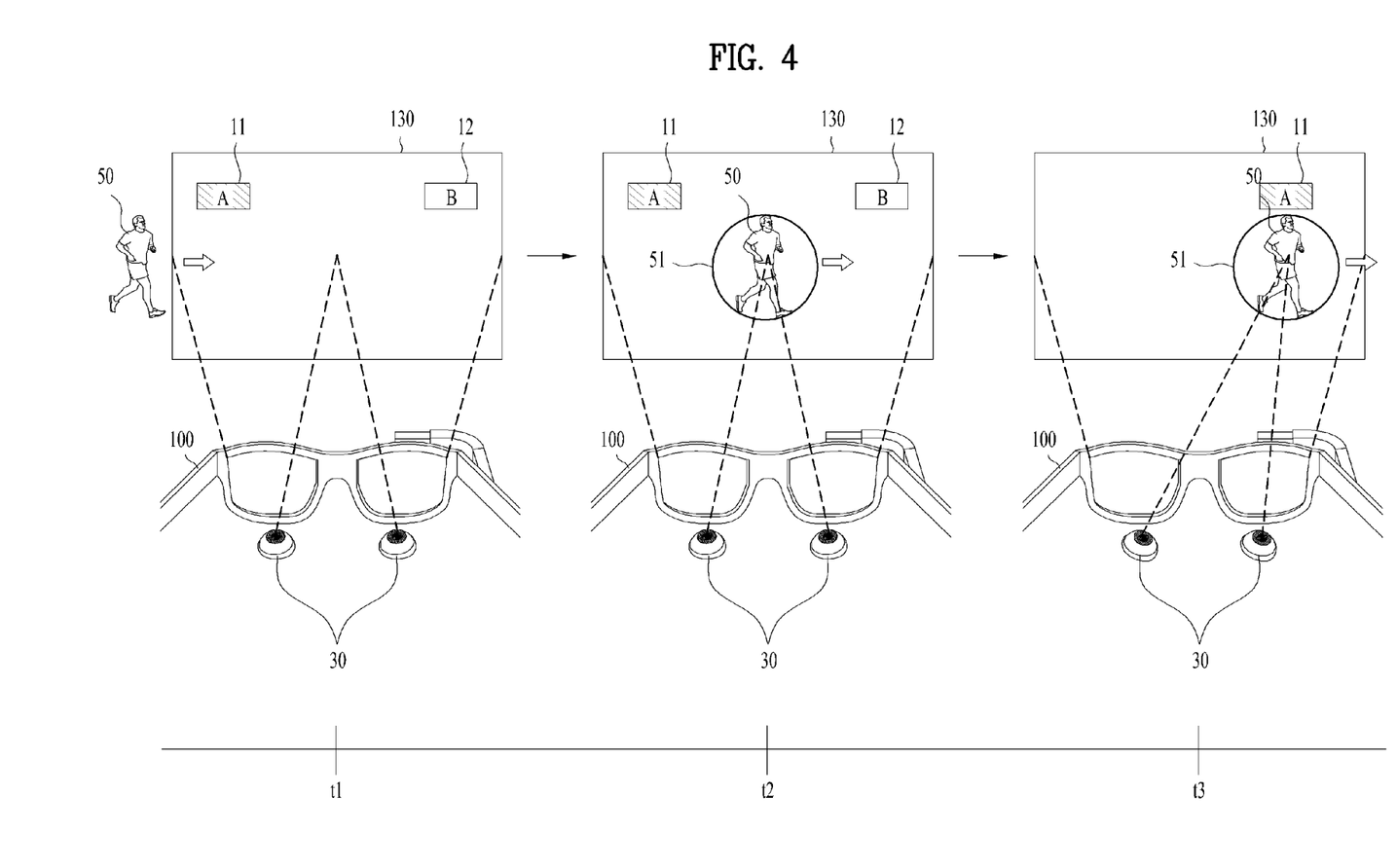
FIG. 4 is a view illustrating a method for displaying an AR image by a portable device according to another embodiment of the present specification.

FIG. 4 is a view illustrating a method for displaying, an AR image by a portable device according to another embodiment of the present specification. In more detail, FIG. 4 illustrates a second embodiment of a method for displaying an AR image by the portable device when a target object is a moving object. Hereinafter, similar or repeated detailed descriptions of FIGS. 1 to 3 will be omitted herein.

Like at a point of time t1 of FIG. 4, the portable device 100 may display the first AR image 11 at a first location and display the second AR image 12 at a second location on the display unit 130. In addition, the portable device 100 may detect user gaze and determine the target object based on user gaze.

Like at a point of time t1 of FIG. 4, when the target object is not determined, the portable device 100 may maintain display of the first AR image 11 and the second AR image 12.

Like at a point of time t2 of FIG. 4, when the target object is determined, the portable device 100 may further display an indicator 51 indicating that the real object 50 is determined as the target object. Through this, the user may visually check that a real object that the user looks at is determined as the target object. In addition, the portable device 100 may identify at least one of an associated AR image and a non-associated AR image from the first AR image 11 and the second AR image 12. In addition, the portable device 100 may determine whether the target object is a moving object.

Like at a point of time t3 of FIG. 4, when the target object is a moving object, the first AR image 11 is identified as an associated AR image, and the second AR image 12 is identified as a non-associated AR image, the portable device 100 may maintain display of the first AR image 11 identified as an associated AR image and terminate display of the second AR image 12 identified as a non-associated AR image. In addition, the portable device 100 may change a display location of the first AR image 11 identified as an associated AR image based on a location of the target object. For example, the portable device 100 may change the display location of the associated AR image so as to position the associated AR image within a first distance from the target object. Here, the first distance may be input to the portable device 100 by the user or may be set by a manufacturer during manufacture of the portable device 100.

That is, the portable device 100 may change the location of the associated AR image so as to position the associated AR image adjacent to the target object. For example, the portable device 100 may change the display location of the first AR image 11 identified as the associated AR image to a third location from the first location. In this case, the third location is within the first distance from the target object and may be changed according to change in the location of the target object. Through this, the portable device 100 may position the associated AR image at a location at which the user looks, thereby improving visibility of the associated AR image.

Figure 5:
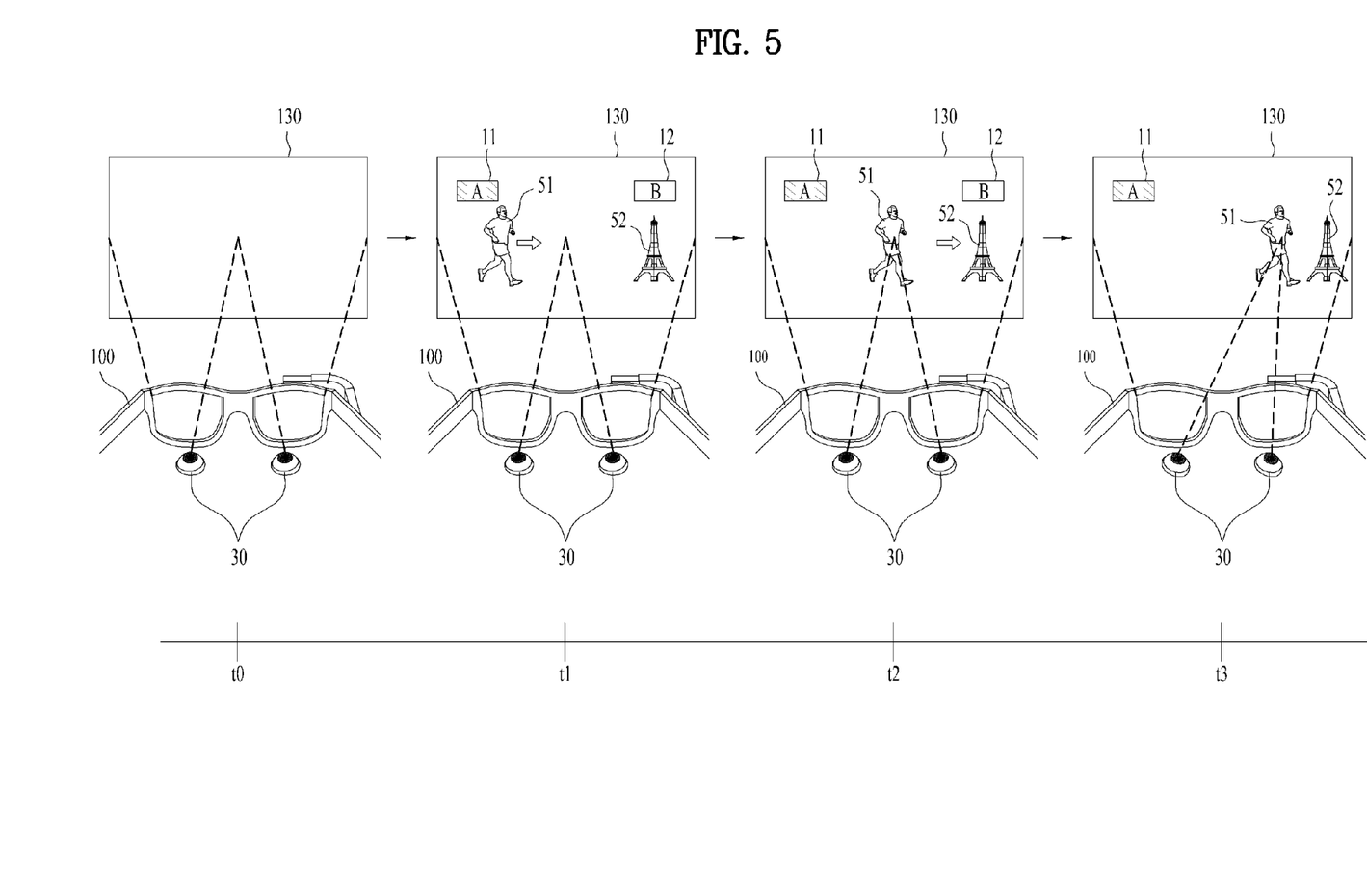
FIG. 5 is a view illustrating a method for displaying an AR image by a portable device according to another embodiment of the present specification.

FIG. 5 is a view illustrating a method for displaying an AR image by a portable device according to another embodiment of the present specification. In more detail, FIG. 5 illustrates a third embodiment of a method for displaying an AR image by the portable device when a target object is a moving object. Hereinafter, similar or repeated detailed descriptions of FIGS. 1 to 4 will be omitted herein.

The portable device 100 may further include a camera unit for capturing an image positioned in front of the portable device 100. As described above, the captured image may include at least one real object and the real object may include a marker of an AR image. Here, the marker may be an appointed pattern or code included on a surface of the real object or the real object itself. In addition, the portable device 100 may detect at least one marker from the image captured by the camera unit and obtain at least one AR image corresponding to the at least one marker.

Like at a point of time t0 of FIG. 5, when a marker is not detected from the captured image, the portable device 100 may not display an AR image. In this case, the portable device 100 may continuously detect a marker from the captured image.

Like at a point of time t1 of FIG. 5, when the marker is detected from the captured image, the portable device 100 may display an AR image corresponding to the detected marker. For example, when a first marker contained in a first real object 51 and a second marker contained in a second real object 52 are detected from the captured image, the portable device 100 may display the first AR image 11 corresponding to the first marker and the second AR image 12 corresponding to the second marker. In addition, when an AR image corresponding to the detected marker is displayed, the portable device 100 may display together an AR image obtained based on location information and direction information of the portable device 100. In addition, the portable device 100 may detect the gaze 30 of the user and determine a target object based on the gaze 30 of the user.

Like at a point of time t1 of FIG. 5, when the target object is not determined, the portable device 100 may maintain display of the first AR image 11 and the second AR image 12.

Like at a point of time t2 of FIG. 5, when the target object is determined, the portable device 100 may identify at least one of the associated AR image and the non-associated AR image from the first AR image 11 and the second AR image 12. For example, when the first real object 51 is determined as the target object, the portable device 100 may identify the first AR image 11 corresponding to the first marker contained in the first real object 51 as the associated AR image and identify the second AR image 12 corresponding to the second marker contained in the second real object 52 as the non-associated AR image. In addition, the portable device 100 may determine whether the target object is a moving object.

Like at a point of time t3 of FIG. 5, when the target object is a moving object, the first AR image 11 is identified as the associated AR image, and the second AR image 12 is identified as the non-associated AR image, the portable device 100 may maintain display of the first AR image 11 identified as the associated AR image and terminate display of the second AR image 12 identified as the non-associated AR image.

Figure 6:
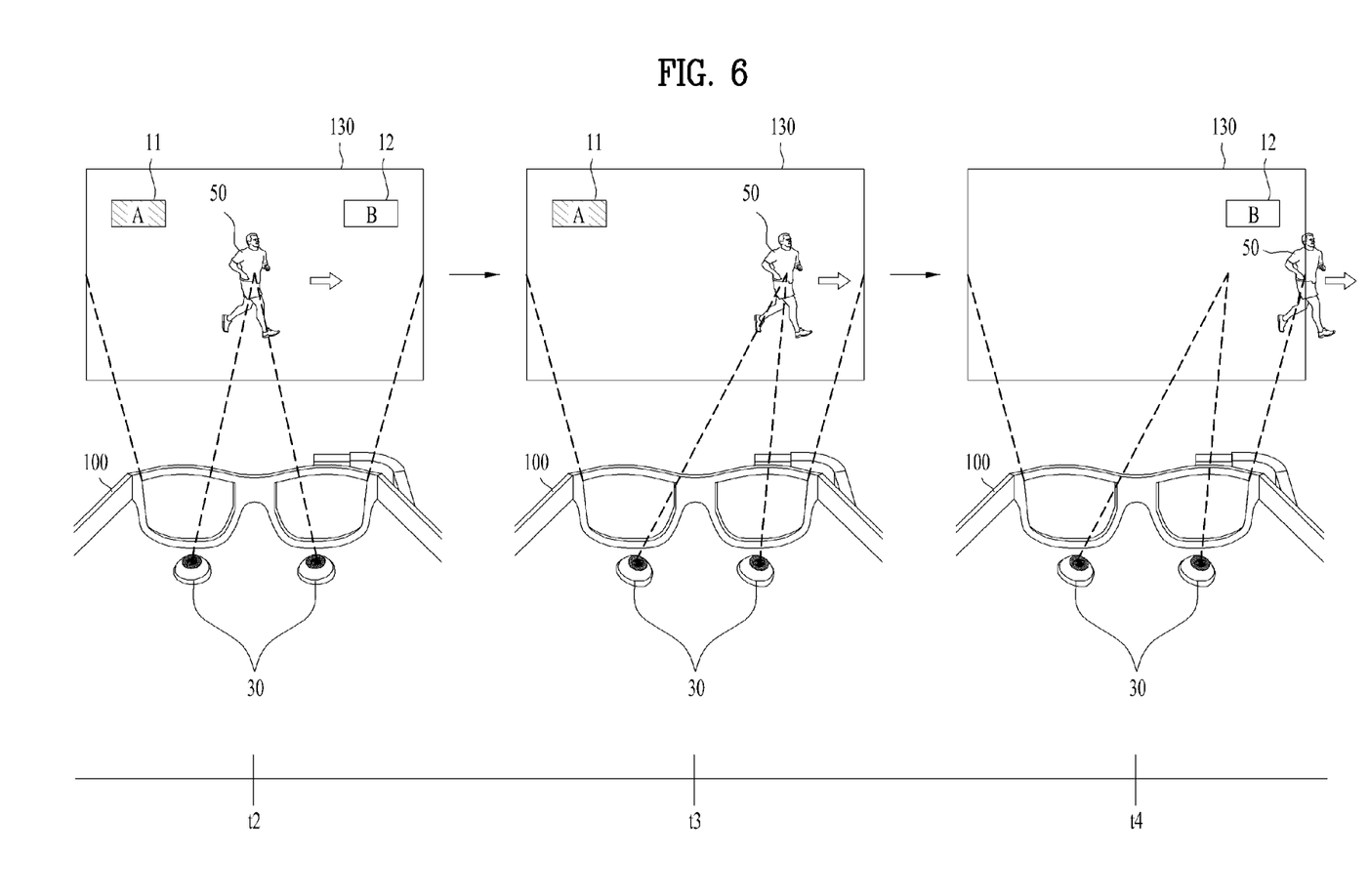
FIG. 6 is a view illustrating a method for displaying an AR image by a portable device according to another embodiment of the present specification.

FIG. 6 is a view illustrating a method for displaying an AR image by a portable device according to another embodiment of the present specification. In more detail, FIG. 6 illustrates a fourth embodiment of a method for displaying an AR image by the portable device when a target object is a moving object. Hereinafter, similar or repeated detailed descriptions of FIGS. 1 to 5 will be omitted herein.

Like at a point of time t2 of FIG. 6, when a target object is determined, the portable device 100 may identify at least one of the associated AR image and the non-associated AR image from the first AR image 11 and the second AR image 12. In addition, the portable device 100 may determine whether the target object is a moving object.

Like at a point of time t3 of FIG. 6, when the target object is a moving object, the first AR image 11 is identified as the associated AR image, and the second AR image 12 is identified as the non-associated AR image, the portable device 100 may maintain display of the first AR image 11 identified as the associated AR image and terminate display of the second AR image 12 identified as the non-associated AR image.

In addition, the portable device 100 may detect whether the gaze 30 of the user is continuously detected to the target object via a gaze detection unit. In addition, the portable device 100 may determine whether the gaze 30 of the user is deviated from the target object for a second time period or more. Here, the second time period may be input to the portable device 100 by the user or may be set by a manufacturer during manufacture of the portable device 100.

Like at a point of time t3 of FIG. 6, when the gaze 30 of the user on the target object is continuously detected, the portable device 100 may maintain display of the first AR image 11 identified as the associated AR image. That is, when the gaze 30 of the user is not deviated from the target object for the second time period or more, the portable device 100 may maintain display of the first AR image 11.

Like at a point of time t4 of FIG. 6, when the gaze 30 of the user on the target object is not detected for the second time period, the portable device 100 may terminate display of the first AR image 11 identified as the associated AR image and re-display the second AR image 12 identified as the non-associated AR image. That is, when the gaze 30 of the user is continuously deviated from the target object for the second time period, the portable device 100 may terminate display of the first AR image 11 identified as the associated AR image and re-display the second AR image 12 identified as the non-associated AR image. Through this, the portable device 100 may terminate display of the associated AR image in which the user becomes less interested and re-display the non-associated AR image in which the user has not been interested, thereby providing various information to the user. In addition, when the gaze 30 of the user is deviated from the target object for the second time period, the portable device 100 may maintain display of the first AR image 11 identified as the associated AR image and re-display the second AR image 12 identified as the non-associated AR image.

Figure 7:
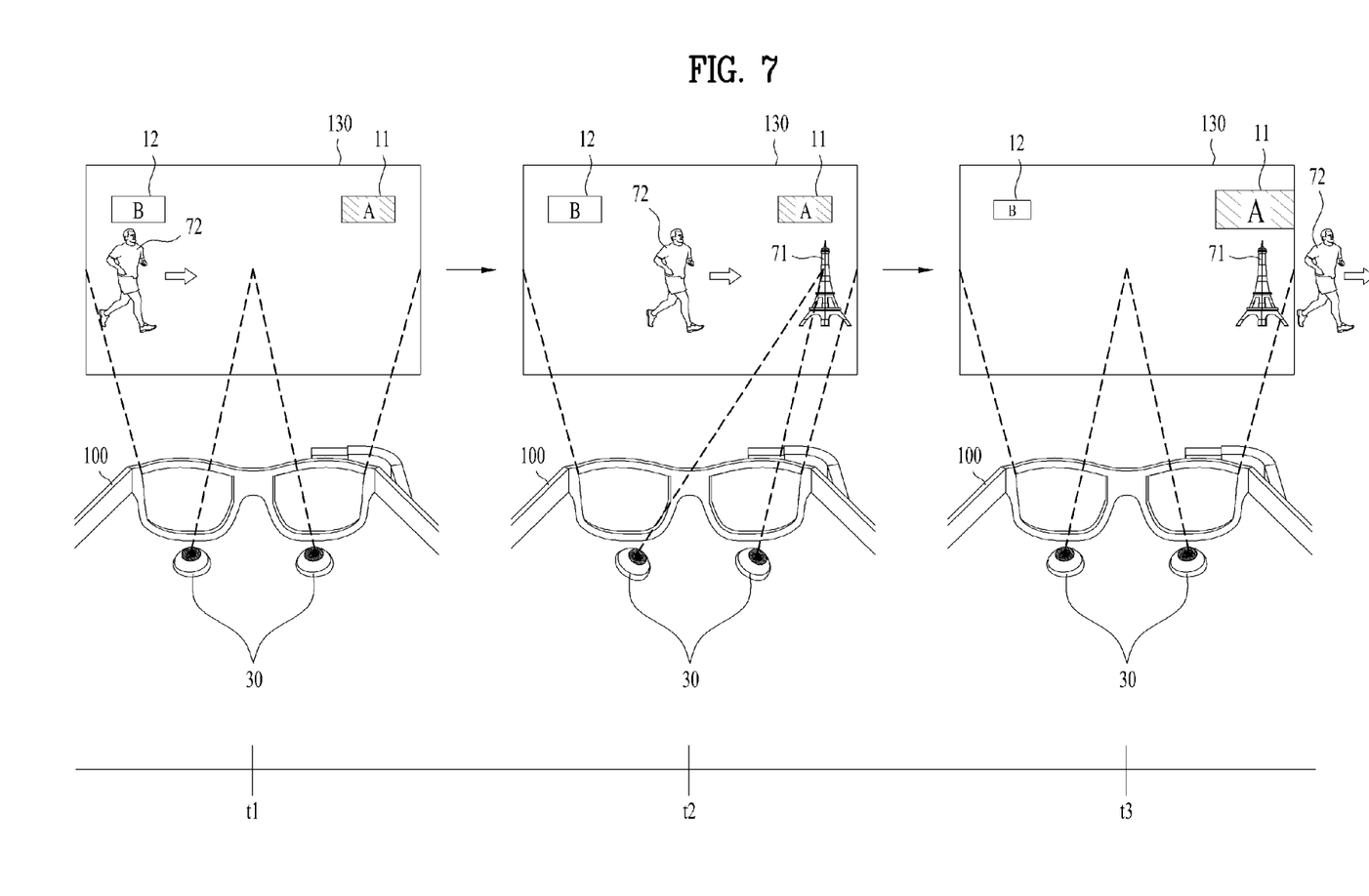
FIG. 7 is a view illustrating a method for displaying an AR image by a portable device according to another embodiment of the present specification.
Figure 8:
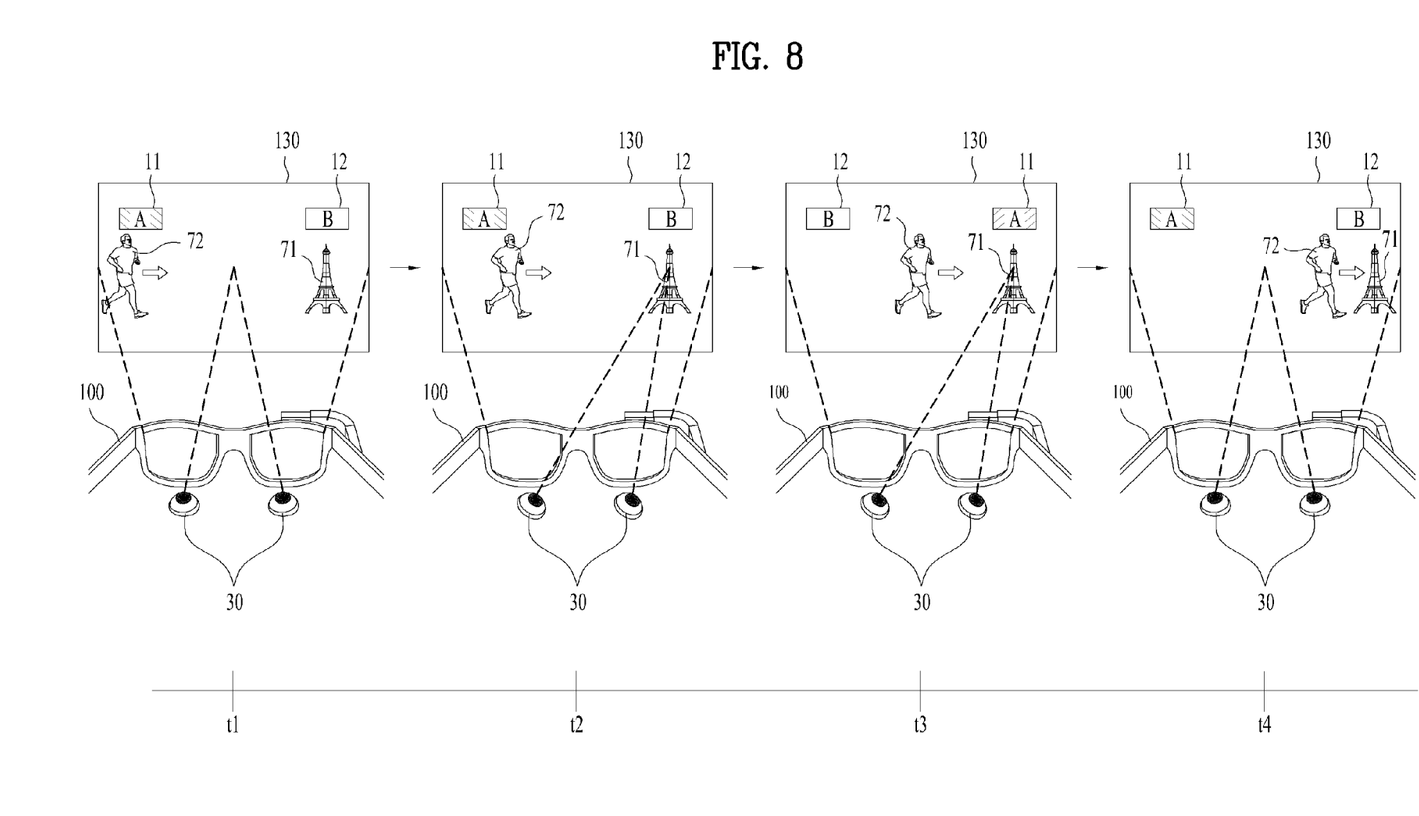
FIG. 8 is a view illustrating a method for displaying an AR image by a portable device according to another embodiment of the present specification.

FIG. 7 is a view illustrating a method for displaying an AR image by a portable device according to another embodiment of the present specification. In more detail, FIG. 7 illustrates a first embodiment of a method for displaying an AR image that is associated with a target object and an AR image that is not associated with the target object by a portable device 100 when the target object is a stationary object. In FIGS. 7 and 8, the target object is a stationary object, a first AR image is identified as an associated AR image, and a second AR image is identified as a non-associated AR image.

Hereinafter, similar or repeated detailed descriptions of FIGS. 1 to 6 will be omitted herein.

Like at a point of time t1 of FIG. 7, the portable device 100 may display the first AR image 11 at a first location and display the second AR image 12 at a second location via the display unit 130. For example, the portable device 100 may display the first AR image 11 corresponding to a first marker contained in a first real object 81 at the first location and display the second AR image 12 corresponding to a second marker contained in a second real object 82 at the second location. In addition, the portable device 100 may detect the gaze 30 of the user and determine the target object based on the gaze 30 of the user.

Like at a point of time t1 of FIG. 7, when the target object is not determined, the portable device 100 may maintain display of the first AR image 11 and the second AR image 12.

Like at a point of time t2 of FIG. 7, when the target object is determined, the portable device 100 may identify at least one of the associated AR image and the non-associated AR image from the first AR image 11 and the second AR image 12. For example, when the first real object 51 is determined as the target object, the portable device 100 may identify the first AR image 11 corresponding to the first marker contained in the first real object 51 as the associated AR image and identify the second AR image 12 corresponding to the second marker contained in the second real object 52 as the non-associated AR image. In addition, the portable device 100 may determine whether the target object is a stationary object.

Like at a point of time t3 of FIG. 7, when the target object is a stationary object, the first AR image 11 is identified as the non-associated AR image, and the second AR image is identified as the associated AR image, the portable device 100 may maintain display of the first AR image 11 and the second AR image 12, and adjust at least one of first display attribute of the first AR image 11 and second display attribute of the second AR image 12.

Here, the first display attribute may be at least one of a display location, a display size, display color, display time, and display transparency of the associated AR image. The second display attribute may be at least one of a display location, a display size, display color, display time, and display transparency of the non-associated AR image.

For example, the portable device 100 may maintain or increase the display size of the first AR image 11 or reduce the display size of the second AR image 12. As another example, when the first location of the first AR image 11 is not adjacent to a target object, the portable device 100 may change the display location of the first AR image 11 to a third location adjacent to the target object. That is, the portable device 100 may display the first AR image 11 to a location adjacent to the target object. Through this, the portable device 100 may improve visibility of the associated AR image.

FIG. 8 is a view illustrating a method for displaying an AR image by a portable device according to another embodiment of the present specification. In more detail, FIG. 8 illustrates a second embodiment of a method for displaying an AR image that is associated with a target object and an AR image that is not associated with the target object by a portable device 100 when the target object is a stationary object.

Like at a point of time t1 of FIG. 8, the portable device 100 may display the first AR image 11 at a first location and display the second AR image 12 at a second location via the display unit 130. In addition, the portable device 100 may detect the gaze 30 of the user and determine the target object based on the gaze 30 of the user.

Like at a point of time t1 of FIG. 8, when the target object is not determined, the portable device 100 may maintain display of the first AR image 11 and the second AR image 12.

Like at a point of time t2 of FIG. 8, when the target object is determined, the portable device 100 may identify at least one of the associated AR image and the non-associated AR image from the first AR image 11 and the second AR image 12.

Like at a point of time t3 of FIG. 8, when the target object is a stationary object, the first AR image 11 is identified as the non-associated AR image, and the second AR image 12 is identified as the associated AR image, the portable device 100 may maintain display of the first AR image 11 and the second AR image 12, and adjust at least one of first display attribute of the first AR image 11 and second display attribute of the second AR image 12.

For example, when the second location of the second AR image 12 is adjacent to the target object, the portable device 100 may change a display location of the first AR image 11 to a second location adjacent to the target object and change a display location of the second AR image 12 to the first location from the second location. Through this, the portable device 100 may improve visibility of the associated AR image.

In addition, the portable device 100 may determine whether the gaze 30 of the user on the target object is continuously detected to for a third time period. That is, the portable device 100 may determine whether the gaze 30 of the user is deviated from the target object for a third time period. Here, the third time period may be input to the portable device 100 by the user or may be set by a manufacturer during manufacture of the portable device 100. In this case, the third time period may be set to be the same as the second time period described with reference to FIG. 6.

Like at a point of time t3 of FIG. 8, when the gaze 30 of the user on the target object is continuously detected, the portable device 100 may maintain display of the first AR image 11 identified as the associated AR image. That is, when the gaze 30 of the user is not deviated from the target object for the second time period, the portable device 100 may maintain display of the first AR image 11.

Like at a point of time t4 of FIG. 8, when the gaze 30 of the user on the target object is not detected to for the third time period, the portable device 100 may re-adjust the adjusted first display attribute to the first display attribute before adjustment and re-adjust the adjusted second display attribute to the second display attribute before adjustment. That is, when the gaze 30 of the user is deviated from the target object for the third time period, the portable device 100 may re-adjust the adjusted first display attribute to the first display attribute before adjustment and re-adjust the adjusted second display attribute to the second display attribute before adjustment. For example, the portable device 100 may re-adjust the display location of the first AR image 11 to the first location from the second location and re-adjust the display location of the second AR image 12 to the second location from the first location. Through this, the portable device 100 may remove the associated AR image in which the user becomes less interested and re-display the non-associated AR image in which the user never has been interested, thereby providing various information to the user.

In addition, FIGS. 3 to 8 illustrate a case in which a portable device displays a plurality of AR images. Alternatively, the portable device may display only one AR image. Upon displaying one AR image, the portable device may identify whether one AR image is an associated AR image or a non-associated AR image. In addition, the portable device may display one AR image using the AR image display method described with reference to FIGS. 3 to 8.

Figure 9:
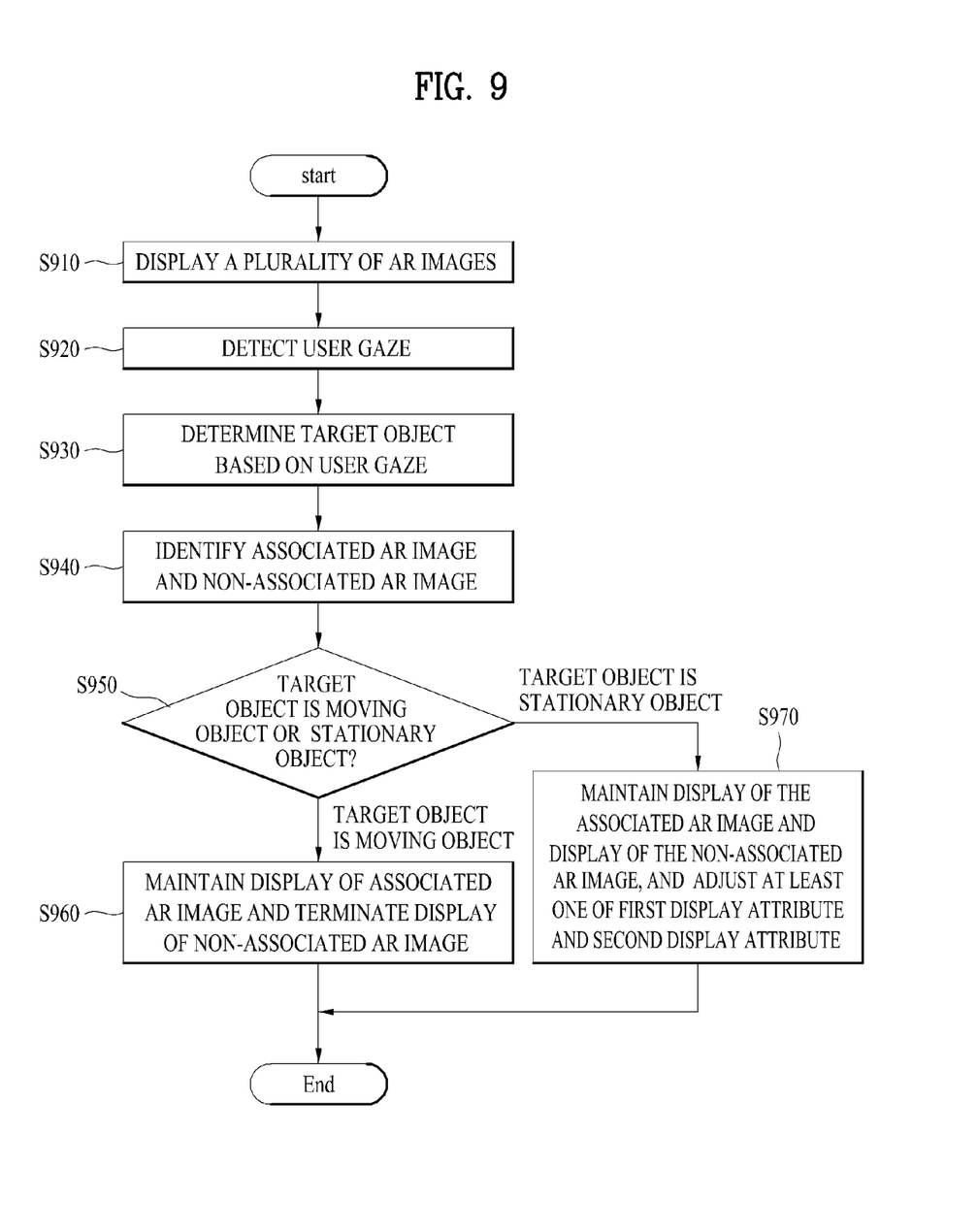
FIG. 9 is a flowchart of a method for controlling a portable device according to an embodiment of the specification.

FIG. 9 is a flowchart of a method for controlling a portable device according to an embodiment of the specification. In this flowchart, similar or repeated detailed descriptions of FIGS. 1 to 8 will be omitted herein.

First, the portable device may display a plurality of AR images (S910). For example, the portable device may detect a marker from an image captured by a camera unit or an image displayed by a display unit and may display an AR image corresponding to the detected marker. As another example, the portable device may display an AR image obtained based on location information and location information of the device. Here, the plurality of AR images may conclude at least one associated AR image and at least one non-associated AR image. Here, the associated AR image may refer to an AR image that is associated with the target object and the non-associated AR image may refer to an AR image that is not associated with the target object.

Then, the portable device may detect user gaze via a gaze detection unit (S920). In addition, the portable device may detect change in the user gaze via the gaze detection unit.

Then, the portable device may determine a target object based on the detected user gaze (S930). Here, the target object may be a real object and may refer to a real object determined based on a gaze location of the user. In this case, the portable device may determine a real object to which the user gaze is detected for a first time period or more as the target object. When there is no object to which the user gaze is detected for the first time period or more, the portable device may not determine the target object. When the target object is not determined, the portable device may maintain display of a plurality of AR images. When the user gaze is detected to the real object for the first time period or more, the portable device may determine the real object as the target object.

Then, the portable device may identify at least one associated AR image and at least one non-associated AR image from the plurality of displayed AR images (S940). In this case, the portable device may determine whether the target object is associated with the AR image based on a predetermined method or a predetermined algorithm to identify the associated AR image and the non-associated AR image. The predetermined method and the predetermined algorithm may be input to the portable device by the user or an AR service provider, or may be set by a manufacturer during manufacture of the portable device.

Then, the portable device may determine whether the target object is moving object or stationary object (S950). Here, the moving object may refer to a moveable real object and the stationary object may refer to a real object that cannot move. For example, a vehicle, a bus, or the like may be the moving object and a building or the like may be the stationary object. However, in some embodiments, the moving object may be a moveable real object that is currently moving, and the stationary object may be a real object that cannot move or a moveable real object that currently stops moving.

Then, when the target object is a moving object, the portable device may maintain display of the associated AR image and terminate display of the non-associated AR image (S960). Through this, the portable device may maintain only an associated AR image that is associated with a target object at which the user looks among a plurality of AR images so as to easily obtain information about an AR image in which the user is interested.

Furthermore, when the target object is a moving object, the portable device may further detect a movement and a moving direction of the target object. In addition, the portable device may determine whether the AR image identified as the non-associated AR image is positioned in a moving direction of the target object. When the non-associated AR image is positioned in the moving direction of the target object, the portable device may terminate display of the non-associated AR image. When the non-associated AR image is not positioned in the moving direction of the target object, the portable device may not terminate display of the non-associated AR image. Through this, the portable device may determine whether display of the non-associated AR image is terminated by further considering the moving direction of the target object, thereby preventing unnecessary termination of display of the non-associated AR image.

When the target object is a stationary object, the portable device may maintain display of the associated AR image and the non-associated AR image and adjust at least one of first display attribute of the associated AR image and second display attribute of the non-associated AR image (S970). Here, the first display attribute may be at least one of a display location, a display size, display color, display time, and display transparency of the associated AR image. The second display attribute may be at least one of a display location, a display size, display color, display time, and display transparency of the non-associated AR image. Through this, the portable device may improve visibility of the associated AR image.

According to the present specification, a portable device may determine a target object based on user gaze.

According to the present specification, the portable device may identify an associated AR image that is associated with the target object and a non-associated AR image that is not associated with the target object from a plurality of AR images displayed by a display unit.

According to the present specification, when the target object is a moving object, the portable device may maintain display of the associated AR image and terminate display of the non-associated AR image, thereby displaying only an AR image in which a user is interested.

In addition, according to the present specification, when the target object is a stationary object, the portable device may maintain display of the associated AR image and the non-associated AR image and adjust at least one of display attribute of the associated AR image and display attribute of the non-associated AR image, thereby improving visibility of a plurality of AR images displayed on a limited display screen.

For convenience of description, diagrams have been separately described. However, it may be possible to obtain a new embodiment by combining the aforementioned embodiments described with reference to each diagram. In addition, according to needs of one of ordinary skill in the art, a design of a computer readable recording medium having recorded thereon a program for executing the aforementioned embodiments is within the scope of the present specification.

The portable device and the method for controlling the same according to the aforementioned embodiments may be configured by selectively combining an entire or partial portion of the aforementioned embodiments in various modified forms rather than being limited to the configuration and method of the aforementioned embodiments.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

The portable device and the method for controlling the same according to the present specification can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), magnetic tapes, floppy disks, optical data storage devices, etc. In addition, the computer readable recording medium may be embodied as a carrier wave such as transmission via the Internet. The computer readable recording medium can also be distributed over network coupled computer systems so that the computer readable code is stored and executed in a distributed fashion.

In the present specification, a distance, a diameter, and a direction may include a substantial distance, diameter, and direction within a predetermined range as well as an accurate value. That is, in the present specification, a distance, a diameter, and a direction may refer to a substantial distance, diameter, and direction and may have an error within a predetermined range.

In the present specification, an object invention and a method invention have been described. If necessary, both inventions may be subsidiarily applied.

What is claimed is:

1. A portable device comprising:
   a display to display an image;
   a camera to capture a real object positioned in front of the portable device; and
   a processor to control the display to display a plurality of augmented reality (AR) images before a target object is determined,
   wherein the plurality of augmented reality (AR) images include an associated AR image that is associated with the target object and a non-associated AR image that is not associated with the target object,
   wherein the processor detects a first object moving into a viewing angle of the camera from out of the viewing angle of the camera,
   wherein the processor sets the first object as the target object in response to detection of a gaze of a user on the first object for a predetermined period of time,
   wherein the processor identifies the associated AR image and the non-associated AR image among the plurality of displayed AR images,
   wherein the processor terminates displaying of the non-associated AR image while displaying of the associated AR image is maintained, in response to continuous detection of the gaze of the user on the target object,
   wherein the processor detects a moving direction of the target object,
   wherein the processor further determines whether to display the non-associated AR image while the associated AR image is being displayed, based on whether or not the non-associated AR image is positioned on a predicted moving path of the target object,
   wherein the processor maintains displaying of both the associated AR image and the non-associated AR image, in response to deviation of the gaze of the user from the target object and when the non-associated AR image is not positioned on the predicted moving path of the target object, and wherein the processor maintains displaying the associated AR image and terminates displaying of the non-associated AR image when the non-associated AR image is positioned on the predicted moving path of the target object.

2. The portable device according to claim 1, wherein the processor changes a display location of the associated AR image based on a location of the target object.

3. The portable device according to claim 1, wherein the processor changes a display location of the associated AR image so as to position the associated AR image within a first distance from the target object.

4. The portable device according to claim 1, wherein the processor adjusts a display timer of the associated AR image when display of the associated AR image is maintained.

5. The portable device according to claim 4, wherein the processor adjusts the display timer so as to extend display time of the associated AR image.

6. The portable device according to claim 1, wherein the processor detects the moving direction of the target object based on change in the gaze of the user on the target object.

7. The portable device according to claim 1, further comprising a camera to capture an image positioned in front of the portable device.

8. The portable device according to claim 7, wherein the processor detects at least one marker from an image captured by the camera, and displays at least one AR image corresponding to the at least one marker, and
wherein the marker is a predetermined pattern or a predetermined code included on a surface of the target object, near the target object or the target object itself.

9. The portable device according to claim 1, wherein the processor adjusts at least one of a first display attribute of the associated AR image and a second display attribute of the non-associated AR image.

10. The portable device according to claim 9, wherein the first display attribute comprises at least one of a display location, a display size, display color, display time, and display transparency of the associated AR image.

11. The portable device according to claim 9, wherein the second display attribute comprises at least one of a display location, a display size, display color, display time, and display transparency of the non-associated AR image.

12. The portable device according to claim 9, wherein the processor re-adjusts the adjusted first display attribute to the first display attribute and re-adjusts the adjusted second display attribute to the second display attribute when the gaze of the user deviates from the target object for a third time period or more.

13. The portable device according to claim 1, wherein the portable device is a head mounted display.

14. The portable device according to claim 13, wherein the display comprises an optical see-through display panel.

15. The portable device of claim 1, wherein the processor further determines whether to display the non-associated AR image while the associated AR image is being displayed, based on whether the target object is a moving object or a stationary object.

16. A method for controlling a portable device, the method comprising:
displaying a plurality of augmented reality (AR) images before a target object is determined on a display in the portable device,
wherein the plurality of augmented reality (AR) images include an associated AR image that is associated with the target object and a non-associated AR image that is not associated with the target object;
detecting a first object moving into a viewing angle of the camera from out of the viewing angle of the camera by using a processor;
setting the first object as the target object in response to detection of a gaze of a user on the first object for a predetermined period of time;
identifying the associated AR image and the non-associated AR image among the plurality of displayed AR images by using the processor;
terminating displaying of the non-associated AR image while displaying of the associated AR image is maintained, in response to continuous detection of the gaze of the user on the target object;
maintaining displaying of both the associated AR image and the non-associated AR image, in response to deviation of the gaze of the user from the target object and when the non-associated AR image is not positioned on a predicted moving path of the target object; and
maintaining displaying of the associated AR image and terminating displaying of the non-associated AR image when the non-associated AR image is positioned on the predicted moving path of the target object.

17. The method according to claim 16, further comprising:
adjusting at least one of a first display attribute of the associated AR image and a second display attribute of the non-associated AR image by using the processor.

* * * * *